United States Patent

[11] 3,624,412

| [72] | Inventors | Kazutaka Nishimura;<br>Hiromi Shimizu, both of Saitama-ken, Japan |
|---|---|---|
| [21] | Appl. No. | 835,355 |
| [22] | Filed | June 23, 1969 |
| [45] | Patented | Nov. 30, 1971 |
| [73] | Assignee | Shindengen Kogyo Kabushiki Kaisha a.k.a. Shindengen Electric Mfg. Co. Ltd. Tokyo-to, Japan |
| [32] | Priority | June 25, 1968 |
| [33] | | Japan |
| [31] | | 43/53400 |

[54] REGULATED AC POWER SUPPLY UTILIZING A BIDIRECTIONAL POWER THYRISTOR
8 Claims, 7 Drawing Figs.

[52] U.S. Cl.................................................. 307/252 B, 307/252 P, 307/252 Q, 307/305
[51] Int. Cl. ................................................................ H03k 17/00
[50] Field of Search ........................................... 307/252.21, 252.70, 252.71, 252.73, 252.72, 252, 305; 323/22 SC

[56] References Cited
UNITED STATES PATENTS

| 3,484,623 | 12/1969 | Cain | 307/252 |
| 3,517,217 | 6/1970 | Sleater | 307/252 |

OTHER REFERENCES

McNulty, Variable on Time Phase Control Circuit, 2-5-69 RCA Tech. Notes, No. 814.

*Primary Examiner*—Donald D. Forrer
*Assistant Examiner*—David M. Carter
*Attorneys*—Robert E. Burns and Emmanuel J. Lobato ABSTRACT: An apparatus for controlling the supply of AC power from an AC source to a load by controlling, by the use of a firing circuit including a triggering thyristor, the firing angle of a bidirectional power thyristor connected through the load to the terminals of the AC source, where a bidirectional semiconductor diode, such as three-layer diode, having a voltage-current characteristic in which the terminal voltage thereof is substantially constant or slightly decreases in excess of the breakover voltage thereof is provided in the firing circuit to control the firing of the triggering thyristor so as to compensate the fluctuation of the AC voltage supplied from the AC source to the load.

PATENTED NOV 30 1971

INVENTOR.

BY

REGULATED AC POWER SUPPLY UTILIZING A BIDIRECTIONAL POWER THYRISTOR

This invention relates to regulated AC power supplies utilizing a bidirectional power thyristor and more particularly to apparatus for controlling the supply of AC power from an AC source to a load utilizing a bidirectional power diode thyristor or a bidirectional power triode thyristor.

Conventional power supplies of this kind have a relatively wide range of adjustable firing angle. However, if the input AC voltage supplied from the AC source fluctuates with respect to the rated input AC voltage, the output voltage applied to a load of this power supply deviates usually in excess of the fluctuation of the input AC voltage. Moreover, the output voltage is especially unstable at a firing angle $2\pi$, and there is also the possibility of reducing the output voltage to zero in a case of decreasing of the input AC voltage under the above-mentioned condition. As mentioned above, conventional power supplies of this kind cannot perform the stable supply of AC power to the load.

An object of this invention is to provide a regulated AC power supply utilizing a bidirectional power thyristor capable of performing the stable supply of AC power to a load.

The object of this invention have been attained by an apparatus of this invention for controlling the supply of AC power from an AC source to a load by controlling, by the use of a firing circuit including a triggering thyristor, the firing angle of a bidirectional power thyristor connected through the load to the terminals of the AC source, characterized in that a bidirectional semiconductor diode having a voltage-current characteristic in which the terminal voltage thereof is substantially constant or slightly decreases in excess of the bread-over voltage thereof is inserted at a part of the firing circuit to control the firing angle of the triggering thyristor so as to compensate the fluctuation of the AC voltage supplied from the AC source to the load.

The principle of this invention will be better understood from the following more detailed discussion taken in conjunction with the accompanying drawings, in which the same or equivalent parts are designated by the same reference numerals, characters and symbols, and in which.

Figure 1:
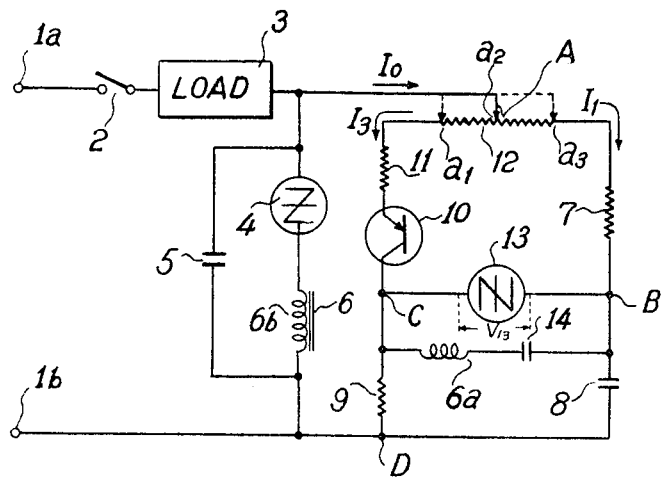
FIG. 1 is a connection diagram for illustrating an embodiment of this invention.

In an embodiment shown in FIG. 1, the AC power is supplied through input terminals $1a$ and $1b$ to a series-connection comprising a switch 2, a load 3, a bidirectional diode power thyristor 4 and a secondary winding $6b$ of a pulse transformer 6. A capacitor 5 is connected in parallel with a series-connection of the power thyristor 4 and the secondary winding $6b$. A control circuit employed for firing the bidirectional power thyristor 4 is a bridge circuit formed by successively connecting so as to form a loop a first resistor 7, a first capacitor 8, a second resistor 9, a bidirectional semiconductor diode 10 (hereinafter further described), a third resistor 11 and a variable resistor 12. In this bridge circuit, a triggering thyristor 13 is connected between a junction B of the resistor 7 and of the capacitor 8 and a junction C of the resistor 9 and of the bidirectional semiconductor diode 10. A series-connection of a capacitor 14 and of the primary winding $6a$ of the pulse transformer 6 is connected in parallel with the triggering thyristor 13. The input AC voltage is applied, through the load 3, across an adjustable terminal A of the variable resistor 12 and a junction D of the capacitor 8 and of the resistor 9.

The bidirectional semiconductor diode 10 is a three-layer diode by way of example and has the voltage-current characteristic in which the terminal voltage of this diode 10 is substantially constant or slightly decreases in excess of the break-over voltage thereof.

In the above embodiment, the following conditions are assumed:

a. The firing angle $\alpha$ of the thyristor 4 has a maximum value $\alpha_{max}$ in a case where the adjustable terminal A of the variable resistor 12 is placed at a position $a_1$ and a minumum value $\alpha_{min}$ in a case where the adjustable terminal A of the variable resistor 12 is placed at a position $a_3$.

b. In a case where the adjustable terminal A of the variable resistor 12 is placed at the vicinity of the position $a_1$ and the firing angle $\alpha_{max}$ is relatively smaller than a value $2\pi$, the operative voltage and current of the diode 10 assume respectively a voltage $V_{30}$ and a current $I_{30}$ as shown in FIG. 3.

c. In a case where the adjustable terminal A of the variable resistor 12 reaches the vicinity of the position $a_3$, the diode 10 is cutoff. Moreover, the respective resistances of the resistors 7, 11 and 12 and the terminal voltage of the diode 10 are determined so that the whole of a current $I_o$ passing through the adjustable terminal A of the variable resistor 12 flows through the resistor 7. A voltage substantially equal to one-half the peak value of the input AC voltage $v_o$ is suited to the operative voltage of the diode 10.

Figure 2:
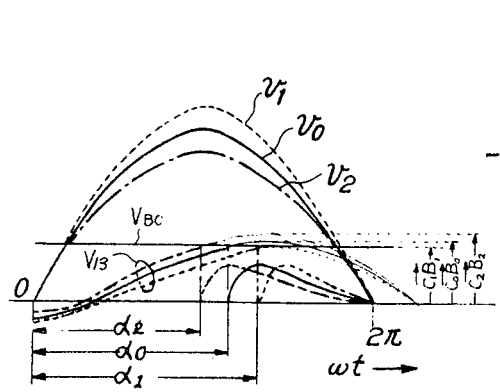
FIG. 2, 3, 5 and 6 are characteristic curves explanatory of the operation and merits of the embodiment of this invention.

The operation of this embodiment will be described in a case where the input AC voltage deviates from the rated voltage $v_o$ to a voltage $v_1$ or $v_2$ as shown in FIG. 2 when the adjustable terminal A of the variable resistor 12 is placed at the position $a_1$, where the firing angle of the thyristor 4 assumes the maximum value $\alpha_{max}$. In this case, it is assumed that the vector of the voltage across the points B and C of the firing circuit is a vector $\overrightarrow{C_o B_o}$ shown in FIG. 4 when the input AC voltage is equal to the rated value $v_o$, and that the firing angle of the thyristor 13 is equal to a value $\alpha_o$ at this time as shown in FIG. 2. In this condition, since the resistance of the resistor 11 is smaller than the resistance of the resistor 9, the voltage across the points A and C is approximately equal to the operative voltage $v_{30}$ of the diode 10. Accordingly, the above-mentioned condition (b) is satisfied.

Figure 3:
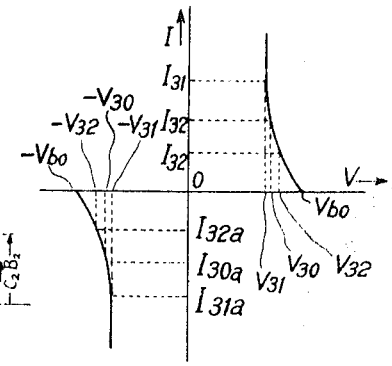
Figure 4:
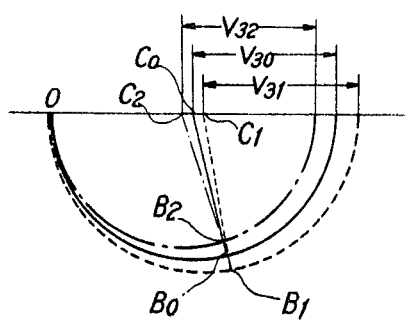
FIG. 4 is a vector diagram explanatory of the operation of the embodiment of this invention.

In this case, if the input AC voltage deviates from the rated voltage $v_o$ to the voltage $v_1$, the operative voltage and current of the diode 10 assume values $V_{31}$ ($<V_{30}$) and $I_{31}$ ($>I_{30}$) respectively as shown in FIG. 3 so that the potential of the point C becomes a value $C_1$ in shifting to the right direction from a value $C_o$ as shown in FIG. 4. Accordingly, the vector of a voltage across the points B and C changes from the vector $\overrightarrow{C_o B_o}$ to a vector $\overrightarrow{C_1 B_1}$ which has a phase position delayed from the phase position of the vector $\overrightarrow{C_o B_o}$ and an absolute value smaller than that of the vector $\overrightarrow{C_o B_o}$. Therefore the firing angle of the triggering thyristor 13 becomes an angle $\alpha_1$, larger than the angle $\alpha_0$.

On the contrary, if the input AC voltage decreases from the rated voltage $v_o$ to the voltage $v_2$, the operative voltage and current of the diode 10 assume values $V_{32}$ ($>V_{30}$) and $I_{32}$ ($<I_{30}$ respectively as shown in FIG. 3 so that the potential of the point C becomes a value $C_2$ in shifting to the left direction from the value $C_o$ as shown in FIG. 4. Accordingly, the vector of a voltage across the points B and C changes from the vector $\overrightarrow{C_o B_o}$ to a vector $\overrightarrow{C_2 B_2}$ which has a phase position advanced from the phase position of the vector $\overrightarrow{C_o B_o}$ and an absolute value larger than that of the vector $\overrightarrow{C_o B_o}$. Therefore, the firing angle of the triggering thyristor 13 becomes an angle $\alpha_2$ smaller than the angle $\alpha_0$.

Figure 5:
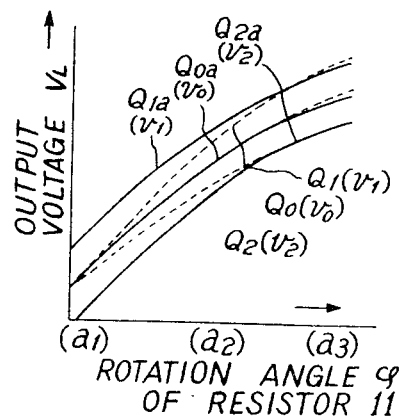

In the above-mentioned operation, the respective firing angles $\alpha_0$, $\alpha_1$ and $\alpha_2$ of the triggering thyristor 13 corresponding to the input voltages $v_0$, $v_1$ and $v_2$ satisfy a condition: $\alpha_1 > \alpha_0 > \alpha_2$. Accordingly, the value of the firing angle of the triggering thyristor 13 changes in the opposite direction to the changing direction of the input AC voltage. Therefore, if the bidirectional semiconductor diode 10 has a voltage-current characteristic in which the terminal voltage of this diode 10 is substantially constant or slightly decreases in excess of the break-over voltage thereof, the deviation of the firing angle of the triggering thyristor 13 caused by the deviation of the input AC voltage can be compensated by the change of the potential of the point C as shown in FIG. 2. As mentioned above, the output voltage $V_L$ applied to the load 3 is maintained at a constant value at the position $a_1$ of the adjustable terminal A of the resistor 12 as shown in FIG. 5 even if the input AC voltage fluctuates. In FIG. 5, curves $Q_0$, $Q_1$ and $Q_2$ show characteristics of the embodiment of this invention respectively corresponding to the input AC voltage $v_0$, $v_1$ and $v_2$, and curves $Q_{0a}$, $Q_{1a}$ and $Q_{2a}$ show characteristics of a conventional apparatus without the semiconductor diode 4. If the rotation angle $\Phi$ of the resistor 11 increases, the deviation range of the output voltage $V_L$ becomes smaller than that of the conventional one.

Figure 6:
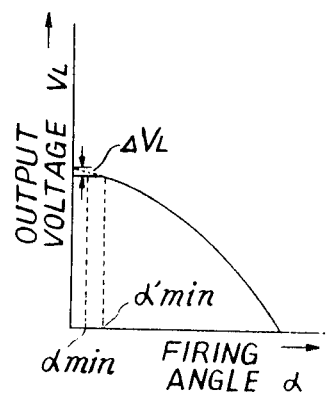

The operation of the embodiment of this invention in a case where the adjustable terminal A of the variable resistor 12 is placed at the position $a_3$ will now be described. If the adjustable terminal A is adjusted from the position $a_1$ to the position $a_2$ the current $I_3$ decreases, and if the adjustable terminal A reaches the position $a_3$ the semiconductor diode 10 is cutoff. Accordingly, the current $I_o$ flowing through the adjustable terminal A becomes substantially equal to a current $I_1$ flowing through the resistor 7, so that the charging time of the capacitor 14 becomes shorter. Therefore, the triggering thyristor 13 reaches, in a short time, the break-over voltage $V_{BO}$ thereof, and the firing angle of the thyristor 13 becomes a minimum firing angle $\alpha_{min}$ shorter than the minimum firing angle $\alpha'_{min}$ of the conventional one as shown in FIG. 6. Moreover, the output voltage $V_L$ becomes larger by a value $\Delta V_L$. This means that the adjustable range of the firing angle becomes wider.

Figure 7:
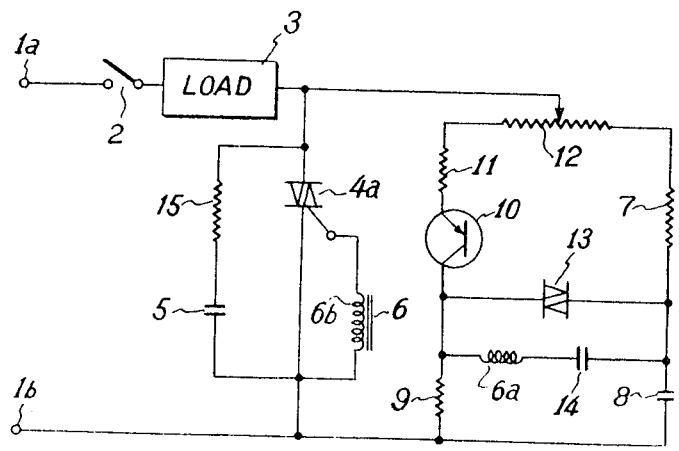
FIG. 7 is a circuit diagram for illustrating another embodiment of this invention.

FIG. 7 shows another embodiment of this invention, in which a bidirectional triode thyristor 4a is employed at the place of the diode thyristor 4 of the embodiment shown in FIG. 1. In this embodiment, the trigger pulse obtained at the secondary winding 6b is applied to the gate terminal of the bidirectional triode thyristor 4a. A resistor 15 and a capacitor 5 are employed for protecting the thyristor 4a and for preventing noise. Other elements are the same as the elements of the embodiment shown in FIG. 1. However, since the break-over voltage of the thyristor 13 may be lower than that of the embodiment shown in FIG. 1, values of elements of the firing circuit are different from those of the embodiment shown in FIG. 1.

As mentioned above, a bidirectional semiconductor diode, such as three-layer diode, having a voltage-current characteristic in which the terminal voltage thereof is substantially constant or slightly decreases in excess of the break-over voltage thereof is employed in accordance with this invention in the firing circuit for firing a bidirectional power diode or triode thyristor. Moreover, the output voltage applied to a load connected in series to the bidirectional power diode is regulated particularly at the low region of the output voltage, and the adjustable range of the output voltage becomes wider than the conventional one. Therefore, the apparatus of this invention is suitable to apply a fader or to control the revolusion of an electric fan, etc.

We claim:

1. An apparatus for regulating the supply of AC power from an AC power source to a load comprising:
   a bidirectional power thyristor connected in series with the load to the terminals of the AC power source, and
   a firing circuit controlling the firing of said bidirectional power thyristor, said firing circuit comprising a triggering thyristor, means coupling the output of said triggering thyristor with said bidirectional power thyristor to trigger the latter and means connected with and responsive to the voltage of the AC power supply to control the firing angle of the triggering thyristor and thereby control the firing angle of said power thyristor; so as to compensate for fluctuation of the voltage of the AC power supplied to the load, said control means comprising a bridge circuit including a resistance and a bidirectional semiconductor diode having a voltage-current characteristic in which the terminal voltage thereof is substantially constant or slightly decreases in excess of the break-over voltage thereof.

2. An apparatus according to claim 1, in which the bidirectional semiconductor diode is a three-layer diode.

3. An apparatus for regulating the supply of AC power from an AC power source to a load comprising:
   a bidirectional power thyristor connected in series with the load to the terminals of the AC power source,
   a firing circuit controlling the firing of said bidirectional power thyristor, said firing circuit comprising a resistance bridge circuit having two pairs of opposite terminals, means for applying the AC power to one pair of opposite terminals of the bridge circuit, a bidirectional triggering thyristor connected across the other pair of
   opposite terminals of the bridge circuit, said bridge circuit having in one arm thereof a bidirectional semiconductor diode having a voltage-current characteristic in which the terminal voltage thereof is substantially constant or slightly decreases in excess of the break-over voltage thereof, and
   means for applying pulses generated by said firing circuit to the bidirectional power thyristor to control the firing angle of the bidirectional power thyristor,
   whereby fluctuation of the voltage of the AC power supplied to the load is compensated for in accordance with the change of the terminal voltage of the bidirectional semiconductor diode.

4. An apparatus according to claim 3, in which the bidirectional semiconductor diode is a three-layer diode.

5. An apparatus for controlling the supply of AC power from an AC source to a load comprising;
   a bidirectional power thyristor connected through the load to the terminals of the AC source,
   a pulse transformer for applying firing pulses to the bidirectional power thyristor to control the firing angle of the bidirectional power thyristor,
   firing means for generating the firing pulses and comprising a bridge circuit formed by connecting in a loop a first resistor, a first capacitor, a second resistor, a third resistor and a variable resistor, the AC voltage from the AC power being applied across the adjustable terminal of the variable resistor and a junction between the first capacitor and the second resistor, a triggering thyristor being connected to a junction between the first resistor and the first capacitor and a junction between the second resistor and the third resistor, a series connection of a second capacitor and the primary winding of the pulse transformer being connected in parallel with the triggering thyristor, and
   a bidirectional semiconductor diode inserted in series in the arm of the third resistor of the bridge circuit and having a voltage-current characteristic in which the terminal voltage thereof is substantially constant or slightly decreases in excess of the break-over voltage thereof,
   whereby fluctuation of the AC power supplied to the load is compensated in accordance with the change of the terminal voltage of the bidirectional semiconductor diode.

6. An apparatus according to claim 5, in which the bidirectional semiconductor diode is a three-layer diode.

7. An apparatus according to claim 6, in which the bidirectional power thyristor is a bidirectional diode thyristor, the secondary winding of the pulse transformer being connected in series to the bidirectional diode thyristor.

8. An apparatus according to claim 6, in which the bidirectional power thyristor is a bidirectional triode thyristor, the secondary winding of the pulse transformer being connected to the control electrode of the bidirectional triode thyristor.

* * * * *